United States Patent [19]

Kitta et al.

[11] 4,286,159

[45] Aug. 25, 1981

[54] DETECTOR COUPLING MECHANISM

[75] Inventors: Hiroyuki Kitta, Yamato; Shinichi Aizawa, Machida; Hiroshi Sawa, Yokohama, all of Japan

[73] Assignee: Hochiki Corporation, Tokyo, Japan

[21] Appl. No.: 28,772

[22] Filed: Apr. 10, 1979

[51] Int. Cl.[3] .............................................. G01N 23/12

[52] U.S. Cl. ........................................ 250/381; 403/3; 403/348

[58] Field of Search ................ 250/381; 340/628, 629, 340/630; 403/13, 14, 3, 4, 348

[56] References Cited

U.S. PATENT DOCUMENTS

| | | | |
|---|---|---|---|
| 3,681,603 | 8/1972 | Scheidweiler et al. | 250/381 |
| 3,710,110 | 1/1973 | Lampart et al. | 250/381 |
| 3,767,917 | 10/1973 | Lampart et al. | 340/629 X |
| 3,964,036 | 6/1976 | Adachi et al. | 340/629 X |
| 4,044,262 | 8/1977 | Minowa | 250/381 |

*Primary Examiner*—Andrew V. Kundrat
*Attorney, Agent, or Firm*—Sughrue, Mion, Zinn, Macpeak & Seas

[57] ABSTRACT

A fire detector comprising a socket and a detector head with an electric circuit therein. The socket is provided with couplings for voluntarily defining the structure of an engaging portion thereof to designate a detector head to be coupled and each engaging portion of the detector heads have a specific structure to engage with the engaging portion defined by the couplings. Hence, no detector head other than the designated detector head can be coupled to the socket plate.

12 Claims, 14 Drawing Figures

DETECTOR COUPLING MECHANISM

BACKGROUND OF THE INVENTION

This invention relates to a fire or smoke detector comprising a detector head and a socket plate, and more particularly to a fire or smoke detector wherein the detector head and the socket plate are provided with an improved coupling mechanism.

A detector which serves as a transmitter for transmitting a fire or smoke detection signal, generally comprising a socket plate secured to a ceiling or the like and a detector head assembly for a detector unit including a detecting section and an electric circuit thereof. Metal coupling terminals are respectively provided to the socket plate and the detector head, so that the detector head is fittingly plugged into the socket plate in a relation that a subsequent rotation therebetween can be carried out to lockingly couple each other. Accordingly, in the case where signal lines from a receiver are connected to the metal coupling terminals of the socket plate, both an electrical connection between the receiver and the detector head and a coupling function between the socket plate and the detector head can be achieved by an engagement of the metal coupling terminals.

Generally, these detectors are classified into an ionization type smoke detector, a photoelectric type smoke detector, a rate of raise type heat detector, a fixed temperature type heat detector and the like in view of a subject to be detected or an operation method thereof. These devices becomes required safety equipment in homes as well as commercial areas. A socket plate which is commonly used with the above described types of detector heads, has been required in recent designs. That is, the engaging position of the metal coupling terminals is identical regardless of the kinds of detector heads so that each kind of detector head can be lockingly coupled to the common socket plate. However, it is necessary to select a suitable detector applicable to the location where the detector is to be utilized. For example, in view of a probability of explosion, a fire detector having an electric switch or a breaking point cannot be employed in the place where an explosive material is stored. Furthermore, a smoke detector cannot be employed in the place where dust scattered in the air exceeds allowable ranges. Accordingly, the required detector is selected such that a suitable detector head designated according to the circumstances need be merely coupled to the corresponding socket plate. In this case, however, because such designation is usually accomplished in a planning step, a possibility exists of an erroneous coupling during actual construction and installation. Furthermore, it should be noted that a possibility also exists of an erroneous coupling where a different kind of detector head is coupled to the socket plate, in the case where after the detector head is removed from the corresponding socket plate during maintenance and inspection thereof, the removed detector head is again coupled.

SUMMARY OF THE INVENTION

Accordingly, an object of this invention is to eliminate the above described difficulties accompanying conventional detectors.

Another object of this invention is to provide an improved coupling mechanism in fire and smoke detectors comprising a detector head and a socket plate, where no detector head other than a detector head previously designated can be coupled to a socket plate.

Still another object of this invention is to provide an improved coupling mechanism in fire and smoke detectors, which is simple in construction and suitable to mass production.

These and other objects of this invention are accomplished by the provision of an improved coupling mechanism in fire and smoke detectors. The detector comprises a detector head and a socket plate, and the socket plate is designed to be commonly used with a variety of compatible detector heads however by designating a suitable detector head to be equipped according to conditions of use of a movable member, each detector head is configured to fit and lockingly couple only to the corresponding socket plate.

Preferred embodiments of a coupling mechanism will be described with reference to the accompanying drawings.

BRIEF DESCRIPTION OF THE DRAWINGS

In the accompanying drawings.

DETAILED DESCRIPTION OF THE PREFERRED EMBODIMENTS

Referring now to the accompanying drawings, and initially to FIGS. 1A to 1E, there is shown a first embodiment of a fire and smoke detector according to this invention, which includes a fire detector head coupling mechanism for detachably coupling a fire and smoke detector head to a socket plate.

Figure 1A:
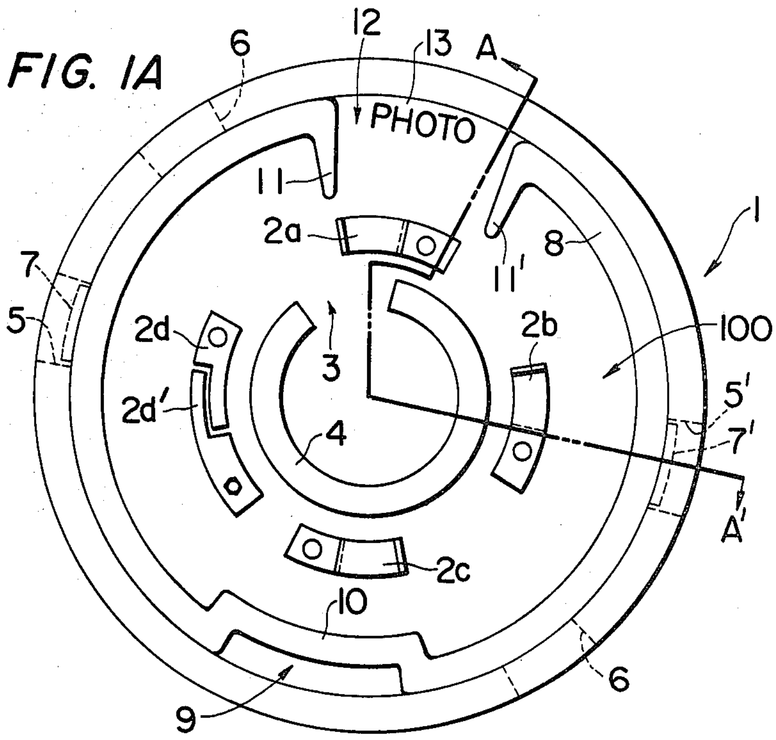
FIG. 1A shows the bottom view of a first embodiment of a socket plate adapted to receive a photoelectric type smoke detector head according to this invention.
Figure 1B:
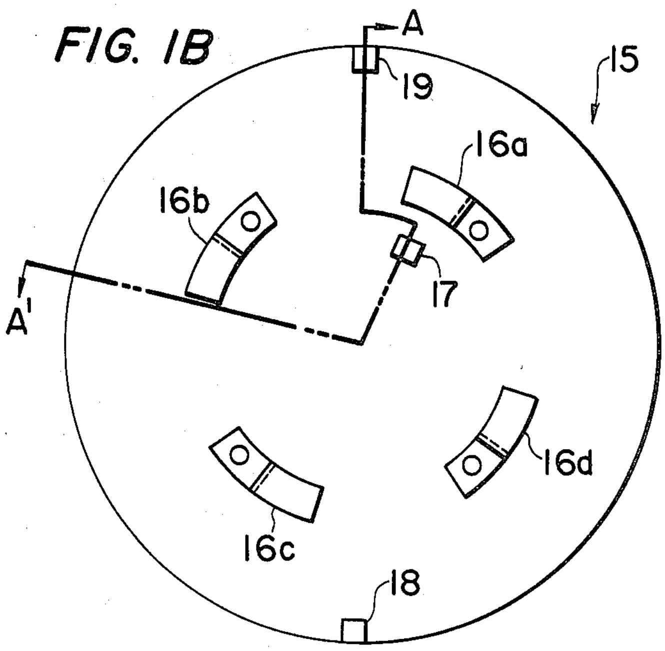
FIG. 1B shows the top view of a first embodiment of a photoelectric type smoke detector head according to this invention.

In FIGS. 1A and 1B which show the bottom surface of a socket plate 1 and the top surface of a photoelectric type smoke detector head 15, respectively. The socket plate 1 has a concave portion 100 adapted to receive the photoelectric type smoke detector head 15 therein. Metal coupling terminals *2a* to *2d* are provided on a base surface concentrically with respect to the center thereof as shown in FIG. 1A. One of these metal coupling terminals composes a pair of metal coupling pieces *2d* and *2d'* for instance, which are separated from each other. A circular projection 4 having a cut-off portion 3 is integrally formed on the base surface of the concave portion 100. Two pair of receiving holes 5 and 5', and 6 and 6' are provided to an inside periphery of the concave portion 100. In case of designating the photoelectric type smoke detector head as a detector head to be coupled, a C-shaped elastic member 8 having a pair of protrusions 7 and 7' is fittingly inserted into concave portion 100 in such a manner that the protrusions 7 and 7' engage with the receiving holes 5 and 5', respectively. The receiving holes 6 and 6' will be described later in detail. Furthermore, a base end portion 10 of the C-shaped elastic member 8 is formed to define a receiving recess 9, whereas two end portions thereof are configured to serve as grippers 11 and 11'. The interval between the grippers 11 and 11' defines a receiving portion 12. In the case where the C-shaped elastic member 8 is positioned as shown in FIG. 1A, it is desirable that an indication mark 13 of "PHOTO" appears on the receiving portion 12 to visually recognize a kind of detection head to be coupled.

In order to move the position of the C-shaped elastic member 8 for the purpose of changing the designation of the detector head, the grippers 11 and 11' are squeezed together against the elastic force of the elastic member 8 to release the engagement between the protrusions 7 and 7' and the receiving holes 5 and 5'. Then the C-shaped elastic member 8 is rotated to shift it to a desired position.

Figure 1C:
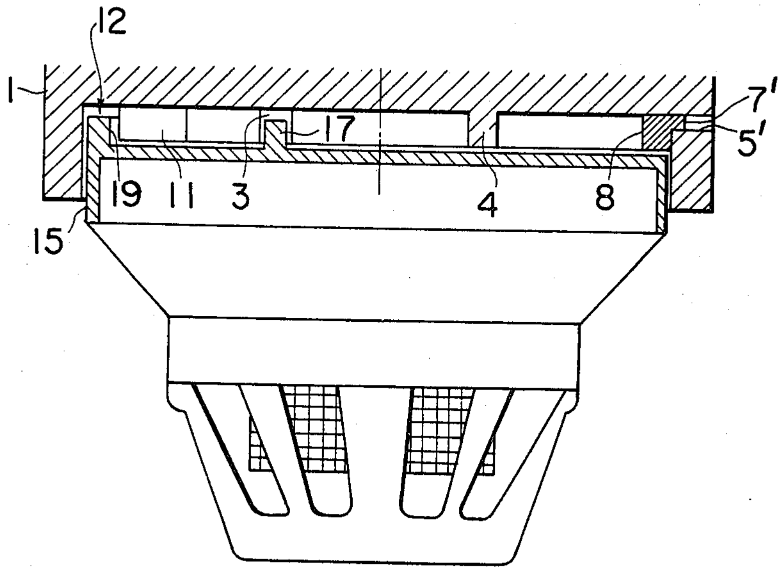
FIG. 1C shows the side view of the socket plate and the detector head coupled each other, which includes a partially cross-sectional view thereof taken along a line A-A in FIGS. 1A and 1B.

The outer periphery of photoelectric smoke detector head 15 is configured to fit with the inner periphery of the concave portion 100. On the top surface of the detector head 15, metal coupling terminals 16*a* to 16*d* are provided in such a manner that they can contact and electrically couple corresponding metal coupling terminals *2a* to *2d* of the socket plate 1, respectively. Three protrusions 17, 18 and 19 are also provided on the top surface of the detector head 15, so that they are allowed to enter into the cut-off portion 3, the receiving recess 9 and the receiving portion 12 of the socket plate 1, respectively, and the detector head 15 is also allowed to rotate in a clockwise direction subsequently in order to fixedly couple the detector head 15 to the socket 1. As a result, the coupling between the socket plate 1 and the photoelectric type smoke detector head, which is best shown in FIG. 1C, can be obtained. Upon the completion of coupling, the above described metal coupling pieces *2d* and *2d'* of the socket plate are electrically connected each other through the corresponding metal coupling terminal 16*d* of the detector head to thereby produce a signal indicating the completion of coupling. This signal is utilized to observe whether the installation of the detector head is correct or if the detector head has been unwillingly removed.

Figure 1D:
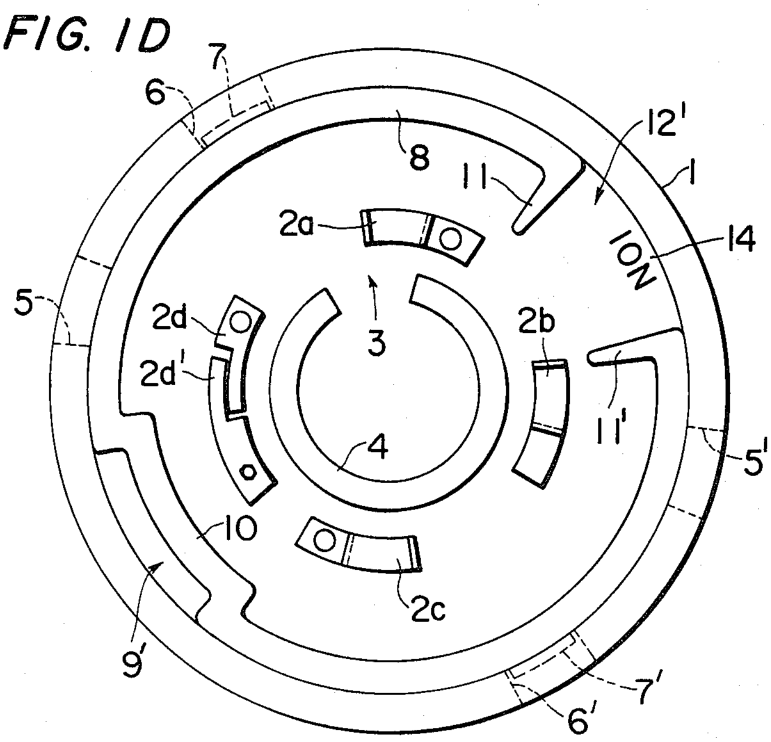
FIG. 1D shows the bottom view of a first embodiment of a socket plate adapted to receive an ionization smoke detector head according to this invention.
Figure 1E:
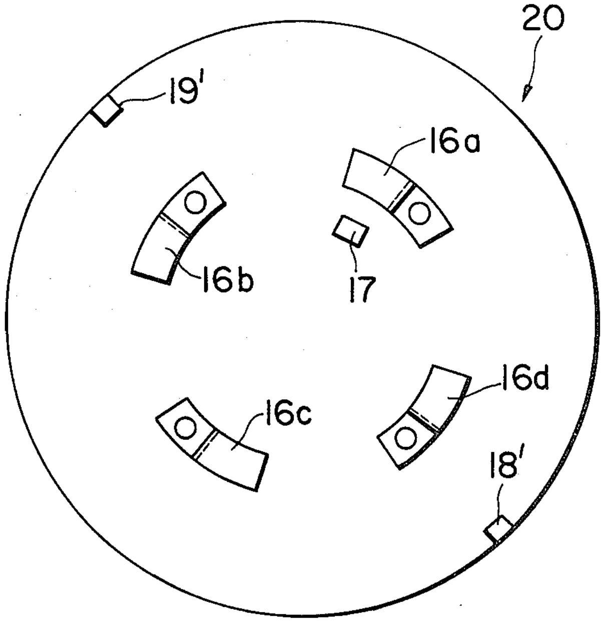
FIG. 1E shows the top view of a first embodiment of an ionization type smoke detector head according to this invention.

In case of designating an ionization type smoke detector head whose top surface is shown in FIG. 1E, the C-shaped elastic member 8 is moved in the aforementioned manner, whereby the protrusions 7 and 7' engage with the other receiving holes 6 and 6', respectively, as shown in FIG. 1D. In this case, it is also desirable that an indication mark 14 of "ION" appears on a receiving portion 12' defined by the grippers 11 and 11' to visually recognize a kind of detector head to be equipped.

As shown in FIG. 1E, the only difference between the photoelectric smoke detector head and an ionization smoke detector 20 in their top surfaces is that protrusions 18' and 19' are positioned at different positions with respect to those of the protrusions 18 and 19. Accordingly, even if the ionization smoke detector head 20 having a different construction from the photoelectric smoke detector head 15 is coupled to the socket plate 1 for the photoelectric smoke detector 15 as shown in FIG. 1A, an insertion of the protrusions 17, 18' and 19' into the cut-off portion 3, the receiving recess 9 and the receiving portion 12 cannot be concurrently satisfied, and therefore no engagements between the metal coupling terminals *2a* to *2d* and 16*a* to 16*d* are obtained.

In order to couple the ionization smoke detector head 20 to the socket plate 1, the grippers 11 and 11' of the C-shaped elastic member 8 are squeezed together against its elastic force to release the engagements between the protrusions 7 and 7' and the receiving holes 5 and 5', and then the C-shaped elastic member 8 is rotated in a clockwise direction, so that the protrusions 7 and 7' engage with the other receiving holes 6 and 6', respectively, as shown in FIG. 1D. As a result, the insertion of the protrusions 17, 18' and 19' into the cut-off portion 3, the receiving recess 9' and the receiving portion 12' are concurrently satisfied. Hence, the subsequent rotation of the head 20 in the clockwise direction can be carried out to obtain the engagements of the metal coupling terminals as described above.

It is apparent that the photoelectric type smoke detector head as shown in FIG. 1B cannot be coupled to the socket plate 1 as shown in FIG. 1D.

The second embodiment of a fire and smoke detector according to this invention will now be described with reference to FIGS. 2A to 2C.

Figure 2A:
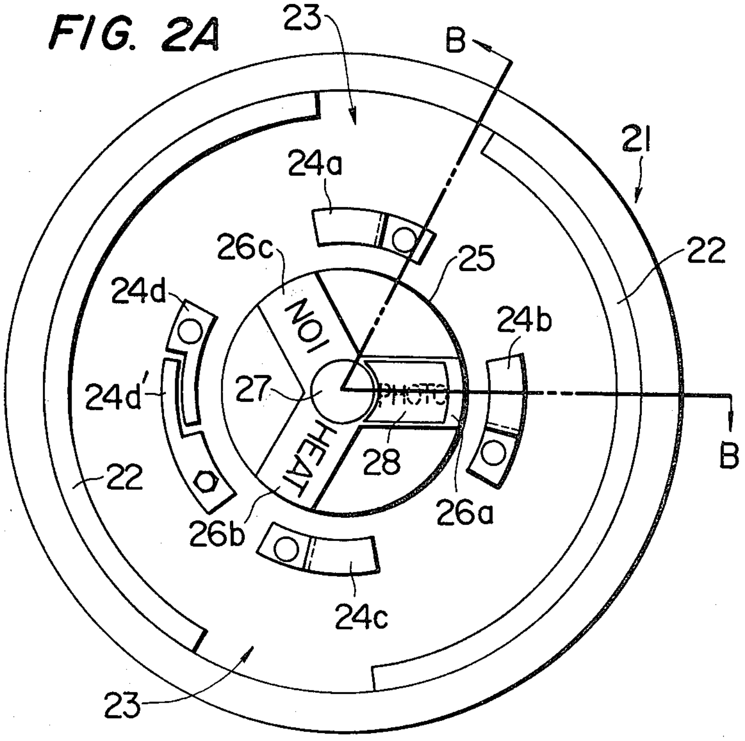
FIG. 2A shows the bottom view of a second embodiment of a socket plate adapted to receive a photoelectric type smoke detector head according to this invention.

FIG. 2A which shows the bottom surface of the second embodiment of a socket plate 21. The socket plate 21 in this embodiment has a concave portion adapted to receive a fire detector head 29 shown in FIG. 2B. A pair of arcuate projections are symmetrically provided, instead of the above described elastic member 8, along the inside periphery of the concave portion to define a pair of receiving portions 23. The receiving portions accept a pair of protrusions 30 of the detector head 29, one corresponding to the receiving recess 9 of the first embodiment and the other corresponding to the receiving portion 12 thereof. The protrusions 30 are concentrically symmetrically provided on the top surface of the detector head 29 as shown in FIG. 2B. Metal coupling terminals 24*a* to 24*d* are provided at the same positions as the first embodiment, respectively. Similarly, metal coupling terminals 31*a* to 31*d* are also provided at the same positions as the first embodiment. Futhermore, at the center of the bottom surface of the socket plate 21, a cylindrical projection 25 is provided having an end surface with three grooves 26*a* to 26*c* radially formed with the same angle at the circumference.

Reference numeral 28 designates a member for designating a kind of detector head to be equipped. The member 28 is ditachably screwed into one desired groove of the grooves 26*a* to 26*c* by a screw 27 and can be replaced according to a kind of detector head. It is desirable that the bottom portions of the grooves 26*a* to 26*c* are labeled to indicate a kind of detector head, that is, "PHOTO", "ION" and "HEAT". For example, in the case where the photoelectric type smoke detector head should be coupled to the socket plate 21, the member 28 is placed in the groove 26*a* and then screwed by the screw 27 as shown in FIG. 2A. The top surface of the photoelectric type detector head 29 has a construction shown in FIG. 2B. Specifically, the detector head 29 has an outside peripheral configuration adapted to be received by the concave portion of the socket plate.

On the top surface of the detector head 29, a sector-like concaved portion 32*a* indicated by a solid line is provided together with the pair of protrusions 30 and the metal coupling terminals 31*a* to 31*d* which have been described above. The sector-like concaved portion 32 is formed, so that it can receive the member 28 screwed in the groove 26*a* and it allows the detector head 29 to be rotated in the clockwise direction in order to fixedly couple the detector head 29 to the socket plate 21 by the engagements of the metal coupling terminals. Hence, the pcsitioning of the concaved portions is attained in accordance with the corresponding groove provided on the socket plate 1. For example, in the case where the ionization type smoke detector head is required to couple to the socket plate 1 as shown in FIG. 2A, the member 28 is removed and replaced to the groove 26*c*. Then the member 28 is screwed again by the screw 27.

Figure 2B:
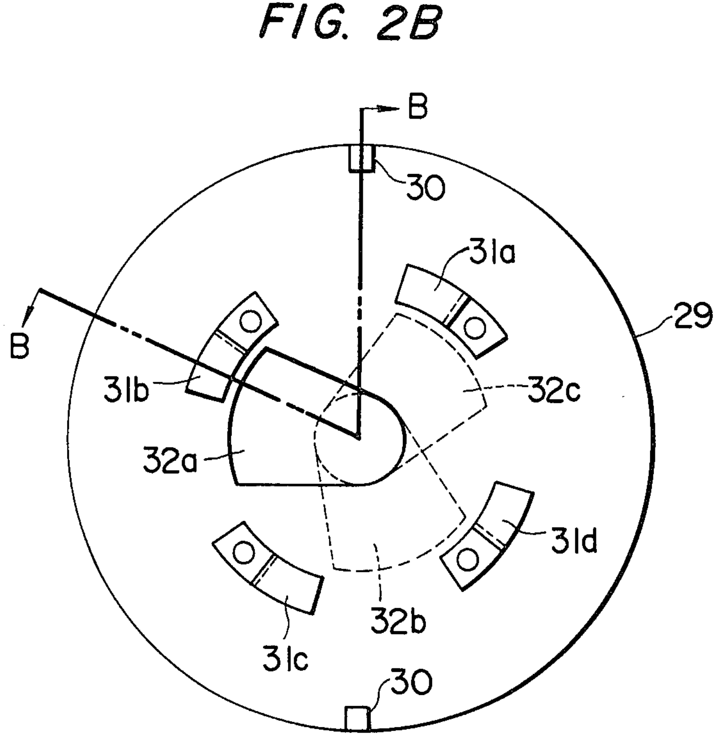
FIG. 2B shows the top view of a second embodiment of a photoelectric type smoke detector head according to this invention.
Figure 2C:
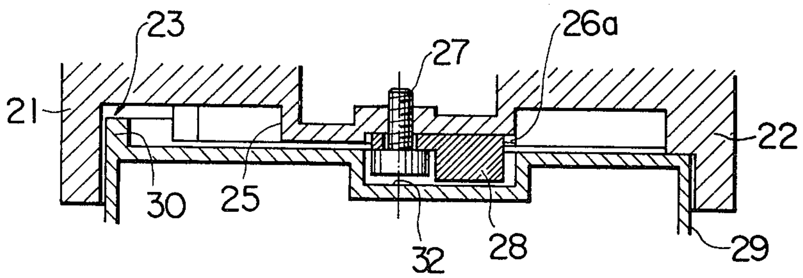
FIG. 2C shows the partially cross-sectional view of the socket plate and the detector head coupled each other taken along a line B-B in FIGS. 2A and 2B.

The ionization type smoke detector head has a sector-like concaved portion 32*c* at the position as indicated by a broken line in FIG. 2B. Accordingly, the member 28 can be received by the concave portion 32*c*, whereas the pair of protrusions 30 are received by the receiving portions 23, respectively. As a result, the fitting between the detector head and the socket plate 1 can be completely obtained and therefore the subsequent rotation in the clockwise direction can be carried out to fixedly couple those elements together by the engagements of the metal coupling terminals. Furthermore, the heat detector head has a sector-like concaved portion 32*b* at the position as indicated by a broken line in FIG. 2B.

It is apparent that, although this type socket plate is commonly used with the photoelectric type and the ionization type smoke detectors and several kinds of heat detectors, once the detector head to be equipped is designated by the member 28, it is impossible to couple different detector heads other than the designated detector head to the socket plate 1.

Figure 3A:
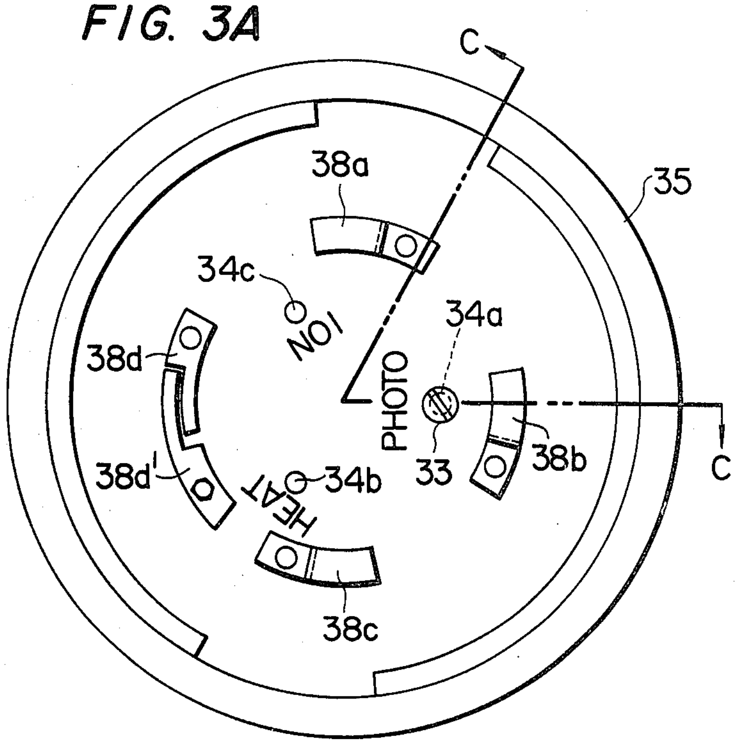
FIG. 3A shows the bottom view of a third embodiment of a socket plate adapted to receive a photoelectric type smoke detector head according to this invention.
Figure 3B:
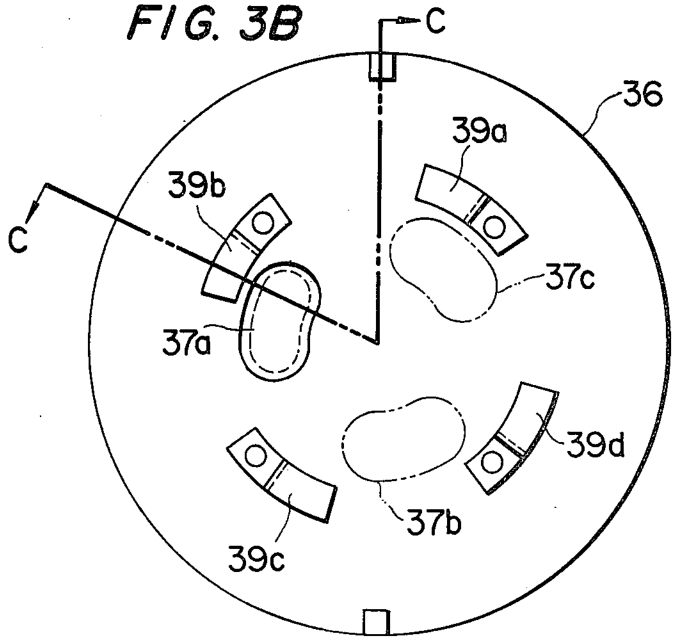
FIG. 3B shows the top view of a third embodiment of a photoelectric type smoke detector head according to this invention.
Figure 3C:
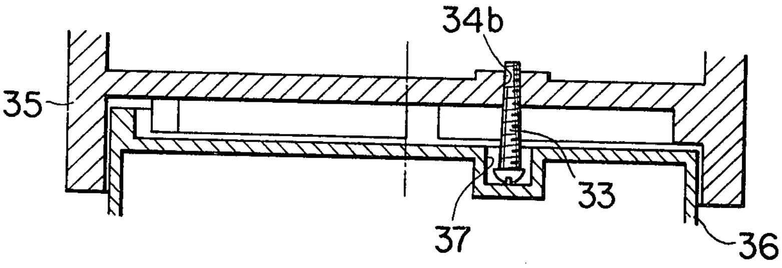
FIG. 3C shows the partially cross-sectional view of the socket plate and the detector head coupled each other taken along a line C-C in FIGS. 3A and 3B.

Referring to FIGS. 3A to 3C, a third embodiment of a fire and smoke detector according to this invention, which is obtained by modifying the aforementioned second embodiment is shown. In this embodiment a screw 33, detachable to a socket plate 35, is employed instead of the member 28 of the second embodiment. Instead of the sector-like concaved portion 32*a* shown in FIG. 2B, for example, an elliptically concaved portion 37*a* is provided on the top surface of the photoelectric type smoke detector head. Furthermore, tapped holes 34*a* to 34*c* are provided for threadingly engaging with the screw 33 on the socket plate 35, instead of the cylindrical projection 25 and the grooves 26*a* to 26*c*. The other elements are the same as the second embodiment. The screw 33 may be substituted by force-fit pin. In this case, the tapped holes 34*a* to 34*c* should be replaced by holes having a depth and a diameter sufficient to prevent the pin from falling off.

In this third embodiment, the designation of the detector head to be equipped can be achieved by replacing the screw or pin. FIG. 3A shows that the screw 33 is screwed onto the tapped hole 34*a* to designate the photoelectric type detector head having the elliptically concaved portion 37*a* as shown in FIG. 3B. In contrast, the heat detector head and the ionization smoke detector heads are provided with elliptically concaved portions 37*b* and 37*c* as indicated by broken lines in FIG. 3B, respectively.

Figure 4A:
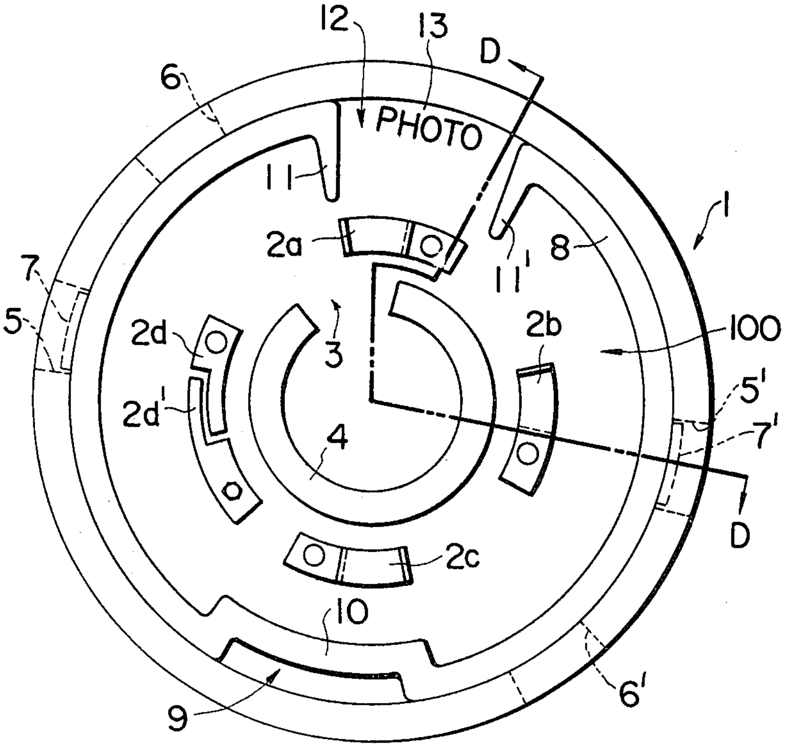
FIG. 4A shows the bottom view of a fourth embodiment of a socket plate according to this invention.
Figure 4B:
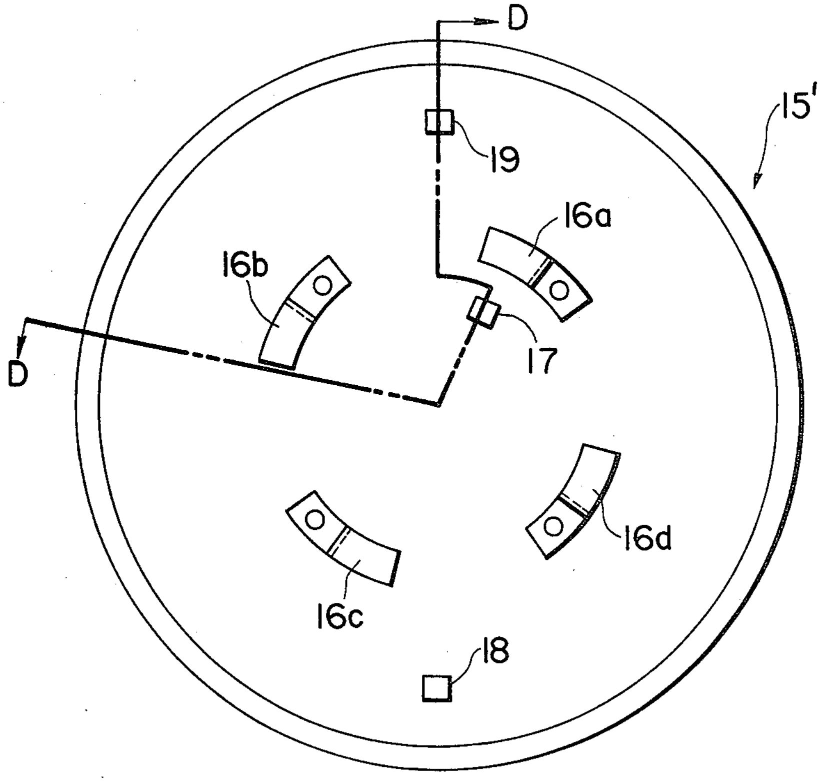
FIG. 4B shows the top view of a fourth embodiment of a photoelectric type smoke detector head adapted to cover the socket plate as shown in FIG. 4A according to this invention.
Figure 4C:
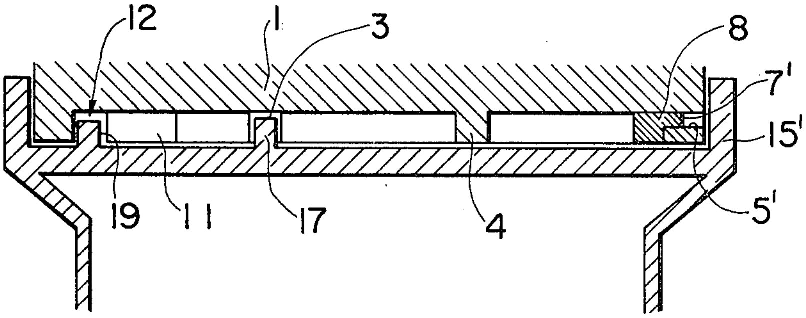
FIG. 4C shows the partially cross-sectional view of the socket and the detector head coupled to each other taken along a line D-D in FIGS. 4A and 4B.

While the aforementioned detector heads employed in the three different embodiments are inserted into the concavity of the socket plate, it is apparent that, a detector head which is designed to cover a socket may also be employed. For example, the top surface of the detector head shown in FIG. 1B is modified to receive a socket shown in FIG. 1A. Specifically, as shown in FIGS. 4B and 4C, a circular guide member 15' is provided to define a concave portion adapted to receive a socket plate shown in FIG. 4A. It should be noted that the socket shown in FIG. 4A is identical to that shown in FIG. 1A and the same elements in the fourth embodiment as the first embodiment shown in FIGS. 1A and 1B are designated by the same reference numerals.

According to this invention, because the designation of detector head to be equipped is visibly and clearly indicated on the socket plate, prevention of an erroneous coupling of detector head can be enhanced. Furthermore, because the socket plate can be commonly used to every kind of detector head by replacing the member for designating the detector head to a suitable position, and the coupling mechanism is simple to construct, mass production thereof and reduction of the cost can be also achieved.

It is apparent that modifications are possible without departing from the essential scope of this invention.

What is claimed is:

1. In a fire detector having a socket and a detector head with a fire detector and an electric circuit therein, and at least two different couplings on said socket associated with coupling various types of said detector heads to said socket, the improvement comprising; said socket provided with means for selectively defining an engaging portion structure for one designated detector head to be coupled to said socket and precluding coupling other detector heads and each engaging portion of said various type of detector heads having specific structure to engage with a particular engaging portion defined by said means, whereby no detector head other than the designated detector head can be coupled to said socket plate.

2. The apparatus of claim 1 further comprising indication means to designate what detector head may be coupled to said socket plate.

3. The apparatus of claim 1 wherein said fire detector socket is generally circular having an inner portion and a series of receiving holes on the periphery of said socket and wherein said means comprises an elastic member fitting in said inner portion and having a projection engaging at least one of said receiving holes.

4. The apparatus of claim 3 wherein said elastic member is semi-circular.

5. The apparatus of claim 4 wherein said fire detector socket has indication means disposed in the open circumferential portion of said elastic member whereby when said elastic member is shifted such that said projections engage different receiving holes, corresponding indications are present in said open circumferential portion to designate the correct detector head that may be coupled for that orientation of said elastic member.

6. The apparatus of claim 1 wherein said fire detector socket is generally circular having a pair of receiving portions about the periphery and a radially positioned member having a projection to engage an appropriate detector head.

7. The apparatus of claim 6 wherein said radially positioned member is shiftable to different portions about a center axis of said detector socket.

8. The apparatus of claim 7 wherein said fire detector socket has indication means disposed in positions adapted to be selectively covered by said radially positioned member to thereby indicate the type of detector head to be mounted.

9. The apparatus of claims 6, 7 or 8 wherein said radially positioned member comprises a tab member extending from the center axis of said socket to a position radially outward in a sector.

10. The apparatus of claims 6 or 7 wherein said radially positioned member comprises a rod like member and said detector socket has a plurality of spaced holes to selectively receive said rod like member and, said member having a portion extending from said socket and engaging an appropriate detector head.

11. The apparatus of claim 10 wherein said rod like member is a screw selectively screwed into said spaced holes.

12. The apparatus of claim 10 wherein said rod like member is a pin force fitted into said spaced holes.

* * * * *